United States Patent
Fetters et al.

(10) Patent No.: US 7,022,774 B2
(45) Date of Patent: Apr. 4, 2006

(54) FUNCTIONALIZED POLY (ETHYLENE-CO-SYNDIOTACTIC PROPYLENE)

(75) Inventors: Lewis J. Fetters, Ithaca, NY (US); Geoffrey W. Coates, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 10/921,207

(22) Filed: Aug. 19, 2004

(65) Prior Publication Data

US 2006/0041070 A1 Feb. 23, 2006

(51) Int. Cl.
*C08F 36/04* (2006.01)
*C08L 23/14* (2006.01)
*C08L 23/16* (2006.01)

(52) U.S. Cl. ............. 525/240; 525/242; 525/232; 526/348

(58) Field of Classification Search ......... 525/240, 525/242, 232; 526/348
See application file for complete search history.

(56) References Cited

U.S. PATENT DOCUMENTS 5,516,828 A * 5/1996 Kwak et al. .......... 524/401
6,562,930 B1 5/2003 Coates et al. ......... 526/351
6,632,885 B1 * 10/2003 Morizono et al. ..... 525/191
6,787,624 B1 9/2004 Coates et al. ......... 526/348

FOREIGN PATENT DOCUMENTS

WO 2004/067589 8/2004

OTHER PUBLICATIONS

Hustad, P.D., et al, J. Am. Chem. Soc. 124, 3614-3621 (2002).
Hustad, P.D., et al., J. Am. Chem. Soc. 124, 11578-11579 (2002).
Tian, J., et al., J. Am. Chem. Soc. 123, 5134-5135 (2001).

* cited by examiner

*Primary Examiner*—James J. Seidleck
*Assistant Examiner*—Olga Asinovsky
(74) *Attorney, Agent, or Firm*—Bacon & Thomas, PLLC

(57) ABSTRACT

Poly(ethylene-co-syndiotactic propylene) functionalized with group(s), that enable crosslinking, e.g., vinyl or anhydride group(s), in admixture with crosslinking agent and filler is subjected to crosslinking reaction to provide filled copolymer. The presence of propylene in syndiotactic sequences provides lower entanglement molecular weight compared to other propylene placement and therefore allows more filler to be present than for other propylene placement. Crosslinking provides filled materials with good elastomeric properties.

13 Claims, 3 Drawing Sheets

FUNCTIONALIZED POLY (ETHYLENE-CO-SYNDIOTACTIC PROPYLENE)

TECHNICAL FIELD

This invention is directed to random ethylene propylene copolymers.

BACKGROUND OF THE INVENTION

Hustad, P. D., Tian, J. and Coates, G. W., J. Am. Chem. Soc. 124, 3614–3621 (2002) discloses ethylene propylene copolymerization using a living catalyst system of bis(phenoxyimine)-based titanium catalyst activated by methylaluminoxane. The copolymer that was produced contained propylene present in syndiotactic sequences, but the article does not mention this and there was no recognition of this at the time of the synthesis set forth in the article or at the time of publication and there was no recognition or disclosure that the copolymer could accommodate more filler than if propylene were present in atactic or isotactic sequences.

Coates et al U.S. Pat. No. 6,562,930 discloses block copolymers containing syndiotactic block(s) and ethylene propylene blocks made using catalyst system of bis(salicylaldminato)titanium complex activated by methylaluminoxane. The ethylene propylene blocks contained propylene present in syndiotactic sequences, but the patent does not disclose this.

SUMMARY OF THE INVENTION

It has been discovered herein that the copolymers of ethylene and propylene made using a catalyst system of bis(salicyladiminato)titanium complex activated by methylaluminoxane contain propylene present in syndiotactic sequences and that this presence provides markedly higher plateau modulus and therefore significantly lower entanglement molecular weight compared to atactic and isotactic counterparts and that these characteristics are retained or increased when the copolymers are functionalized to enable crosslinking and that these characteristics allow more filler to be present in crosslinkable admixtures and after crosslinking is carried out to obtain elastomers than in the case of isotactic and atactic counterparts.

In one embodiment of the invention herein, there is provided poly(ethylene-co-syndiotactic propylene) functionalized with groups that enable crosslinking, the functionalized poly(ethylene-co-syndiotactic propylene) comprising from 49–70 mole percent ethylene, from 50–25 mole percent propylene and from 1–5 mole percent crosslinking functionalizer, from 50 to 100 mole percent of the propylene being present in syndiotactic sequences (i.e., with consecutive propylenes being in syndiotactic relationship), the functionalized poly(ethylene-co-syndiotactic propylene) having $M_n$ ranging from 1,000 to 2,000,000 and $M_w/M_n$ ranging from 1–10.

The functionalized poly(ethylene-so-syndiotactic propylene) is advantageously used in admixture with from 0.01 to 10 weight percent crosslinking agent and from 5 to 50 weight percent filler including a weight percent filler greater than that tolerated when atactic or isotactic counterparts are present.

The admixture is crosslinked to provide filled elastomer.

The molecular weights ($M_n$ and $M_w$) and polydispersities ($M_w/M_n$) are measured by gel permeation chromatography using polystyrene standards.

The term "elastomer" is used herein to mean a thermosetting high polymer having the ability to be stretched to at least twice its original length and to retract very rapidly to approximately its original length when released.

BRIEF DESCRIPTION OF THE DRAWINGS

FIG. 1 is a graph of loss modulus $G''(\omega)$ versus angular frequency $\omega$ in $sec^{-1}$ for composition 1-6a.

FIG. 2 is a graph of loss modulus $G''(\omega)$ versus angular frequency $\omega$ in $sec^{-1}$ for composition 2-227a.

Figure 1:
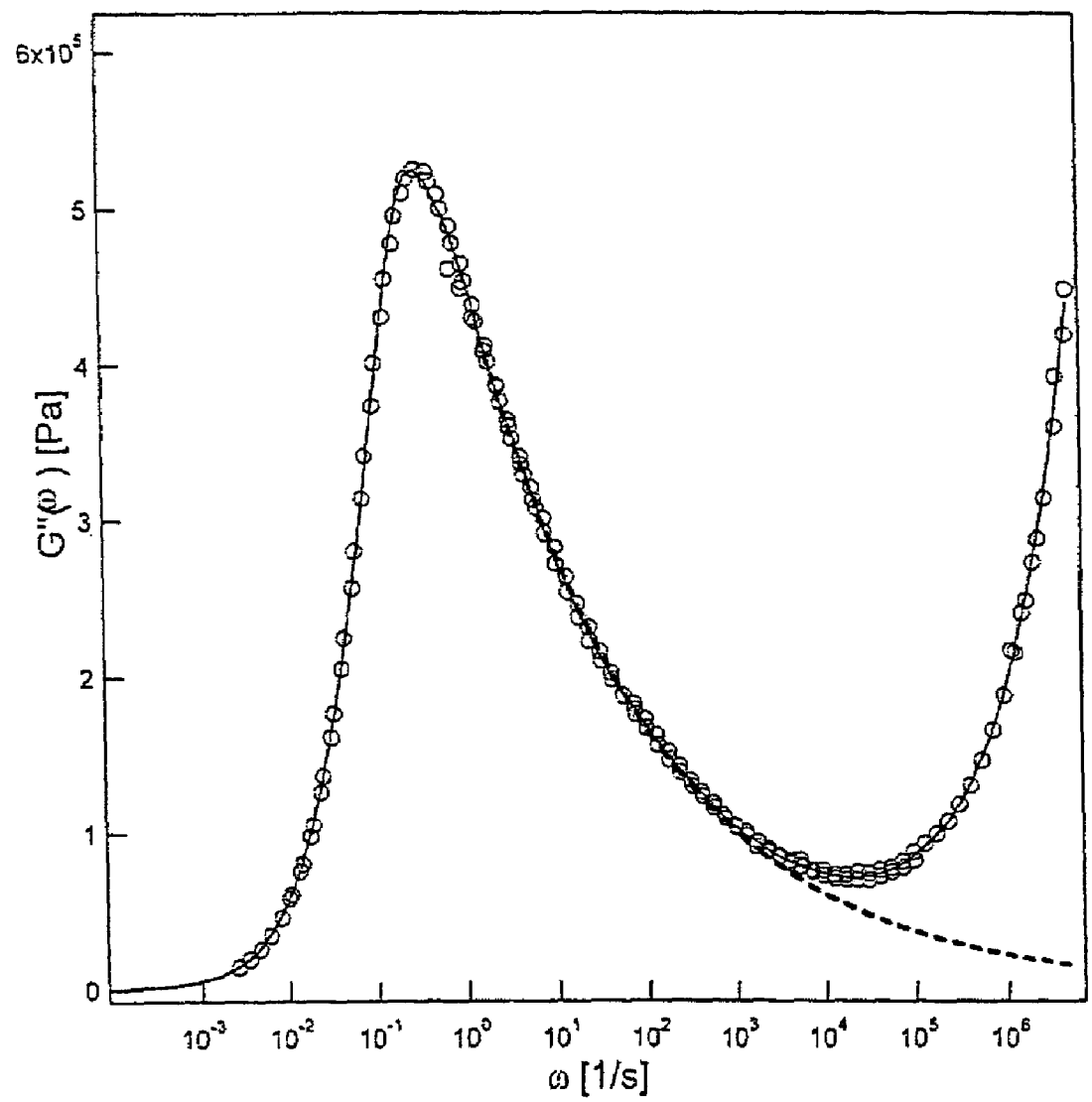

All the figures relate to Background Example 4.

DETAILED DESCRIPTION

The functionalized poly(ethylene-co-syndiotactic propylene) preferably comprises from 54–65 mole percent ethylene, from 45–32 mole percent propylene, and from 1–3 mole percent crosslinking functionalizer, and has Mn ranging from 400,000 to 750,000 and $M_w/M_n$ ranging from 1.1 to 5, e.g., 1.10–1.30.

The most important functionalized poly(ethylene-co-propylene) comprises 60 mole percent ethylene, 38 mole percent propylene and 2 mole percent crosslinking functionalizer.

The groups enabling crosslinking include, for example, vinyl group(s) and anhydride group(s).

For providing vinyl group(s) for enabling crosslinking, the crosslinking functionalizer is selected from the group consisting of $C_5$–$C_{10}$-α,ω-dienes, e.g., 1,5-hexadiene.

For providing anhydride groups for enabling crosslinking, the crosslinking functionalizer can be, for example, maleic anhydride We turn now to synthesis of the functionalized poly(ethylene-co-syndiotactic propylene) where the group(s) enabling crosslinking are vinyl group(s). A pressure reaction vessel is charged with compound that converts titanium of the catalyst to cationic form to activate it, e.g., methylaluminoxane (MAO), very preferably polymethylaluminoxane (PMAO), used in an amount ranging from 10:1 to 1,000:1 on a [Al]/[Ti] basis and with aprotic solvent, e.g., toluene. Propylene is then added, then ethylene, then α,ω diene, e.g., 1,5-hexadiene. Then catalyst dissolved in aprotic solvent is added. The catalyst is a catalyst providing living polymerization and chain end control by a mechanism which is exclusively secondary 2,1 insertion mechanism and is preferably a bis(salicyladiminato) titanium complex where optionally substituted phenyl or cyclohexyl on nitrogen catalyzes syndiospecific polymerization of propylene and has formula III in U.S. Pat. No. 6,562,930 and is, for example, Catalyst F or G, very preferably Catalyst G of U.S. Pat. No. 6,562,930. Reaction temperature can range, for example, from –20 to 100° C. and is preferably 0° C., and reaction times can range, e.g., from 1 hour to 50 hours.

We turn now to synthesis of the functionalized poly (ethylene-co-syndiotactic propylene) where the group(s) enabling crosslinking are anhydride group(s). The synthesis of copolymer is carried out as described in the above paragraph except that the diene is omitted. The polymer is mixed with the anhydride, e.g., maleic anhydride, in the presence of a radical initiator, e.g., benzoyl peroxide or di-tert-butyl peroxide or azobisisobutyronitrile, present in an amount of 0.1 to 5 weight percent. It is believed the radical homolyzes a C—H bond, creating a C-based radical on the main chain which reacts with the maleic anhydride to randomly add anhydride groups along the polymeric backbone. Heating at a temperature ranging from 100 to 300° C. for a time period ranging from 10 minutes to 5 hours provides the functionalized copolymer.

For use, the functionalized copolymer, crosslinking agent and filler are formed into a desired object which is subjected to heat to crosslink the copolymer and fix the shape of the object. Without crosslinking, the composition would be subject to cold flow over time. Network formation via crosslinking is a necessity for practical application for the filled composition.

Where the group enabling crosslinking is vinyl group, the crosslinking agent is preferably sulfur admixed in an amount ranging from 0.1 to 5 weight percent and heating, e.g., for a time period ranging from 10 minutes to 5 hours effects the crosslinking reaction.

Where the group enabling crosslinking is anhydride group, the crosslinking agent is a dinucleophilie, e.g., a dialcohol, e.g., 1,6-hexanediol or ethylene glycol or a diamine, e.g., hydrazine, methlenediamine, ethylenediamine, termethylenediamine, or hexamethylene diamine. The crosslinking agent is admixed in an amount ranging from 0.1 to 5 weight percent and crosslinking is effected by ester or amide crosslink formation.

The filler can be, for example, mineral oil, silica, carbon black, graphite, etc.

Too much filler in the crosslinked composition leads to diminished tensile strengths.

Filled, molded and crosslinked materials from poly(ethylene-co-syndiotactic propylene) can be used in a wide range of elastomer application where polydienes and conventional poly(ethylene-co-propylene) are now used.

One important application is for vehicle tires. The characteristic of no internal double bonds, i.e., within the chain, provides long term chain stability. The low glass transition temperature is a plus since its value of about 215° C. is only several degrees larger than that of polyisoprene.

The invention and background and benefits thereof are exemplified in the following background and working examples.

BACKGROUND EXAMPLE 1

Synthesis of 1-6a

Sample 1-6a of poly(ethylene-co-syndiotactic propylene) was prepared as follows:

A 6 oz. Lab-Crest® glass pressure reaction vessel (Andrews Glass) was charged with PMAO (0.30 g. [Al]/[Ti]= 250) and toluene (50 mL). The reactor was placed in an ice-bath. The nitrogen atmosphere in the reaction was exchanged with propylene three times. Propylene was condensed into the reactor for 30 min at 30 psi. The ethylene was reacted at 31 psi. The catalyst solution (19 mg of Catalyst G described in U.S. Pat. No. 6,562,930, in 5 mL toluene) was injected by syringe. After 90 min, acidic methanol (1 mL) was added by syringe to quench the polymerization. The reactor was vented and the polymer precipitated in acidic methanol (400 mL). After stirring for several hours, the polymer was filtered, washed with methanol and dried (2.27 g, Mn 482,000 g/mol; $M_w/M_n$=1.18).

BACKGROUND EXAMPLE 2

Synthesis of 2-227a

Sample 2-227a of poly(ethylene-co-syndiotactic propylene) was prepared as follows:

A 6 oz. Lab-Crest® glass pressure reaction vessel was charged with PMAO (0.30 g, [Al]/[Ti]=500) and toluene (100 mL). The reactor was placed in an ice-bath. The nitrogen atmosphere in the reaction was exchanged with propylene three times. Propylene was condensed into the reactor for 30 min at 30 psi. Ethylene was added at 40 psi. The catalyst solution (9 mg of Catalyst G described in U.S. Pat. No. 6,562,930, in 5 mL toluene) was injected by syringe. After 60 min, acidic methanol (1 mL) was added by syringe to quench the polymerization. The reactor was vented and the polymer precipitated in acidic methanol (400 mL). After stirring for several hours, the polymer was filtered, washed with methanol and dried (3.05 g, $M_n$=528,000 g/mol; $M_w/M_n$=1.18).

BACKGROUND EXAMPLE 3

Synthesis of 2-12

Sample 2-12 of poly(ethylene-co-syndiotactic propylene) was prepared as follows:

A 6 oz. Lab-Crest® (glass pressure reaction vessel (Andrews Glass) was charged with PMAO (0.19 g, [Al]/[Ti]= 500) and toluene (300 mL). The reactor was placed in an ice-bath. The nitrogen atmosphere in the reaction was exchanged with propylene three times. Propylene was condensed into the reactor for 30 min at 20 psi. The ethylene tank was attached at 20 psi. The catalyst solution (19 mg of Catalyst G described in U.S. Pat. No. 6,562,930, in 5 mL toluene) was injected by syringe. After 60 min, acidic methanol (1 mL) was added by syringe to quench the polymerization. The reactor was vented and the polymer precipitated in acidic methanol (400 mL). After stirring for several hours, the polymer was filtered, washed with methanol and dried (1.8 g, $M_n$=537,000 g/mol; $M_w/M_n$=1.27).

BACKGROUND EXAMPLE 4

Comparison of Rheological Properties

Figure 2:
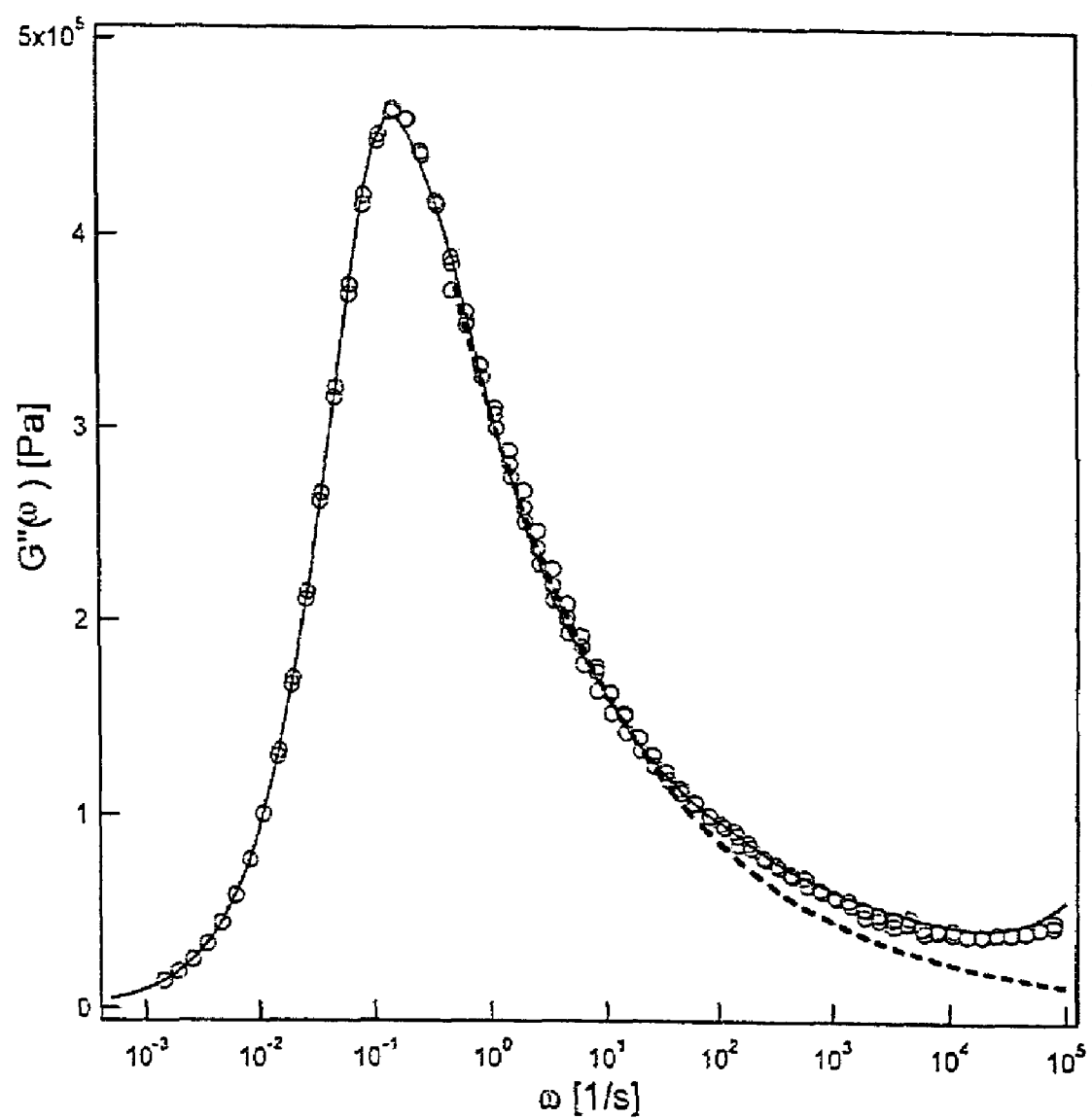
Figure 3:
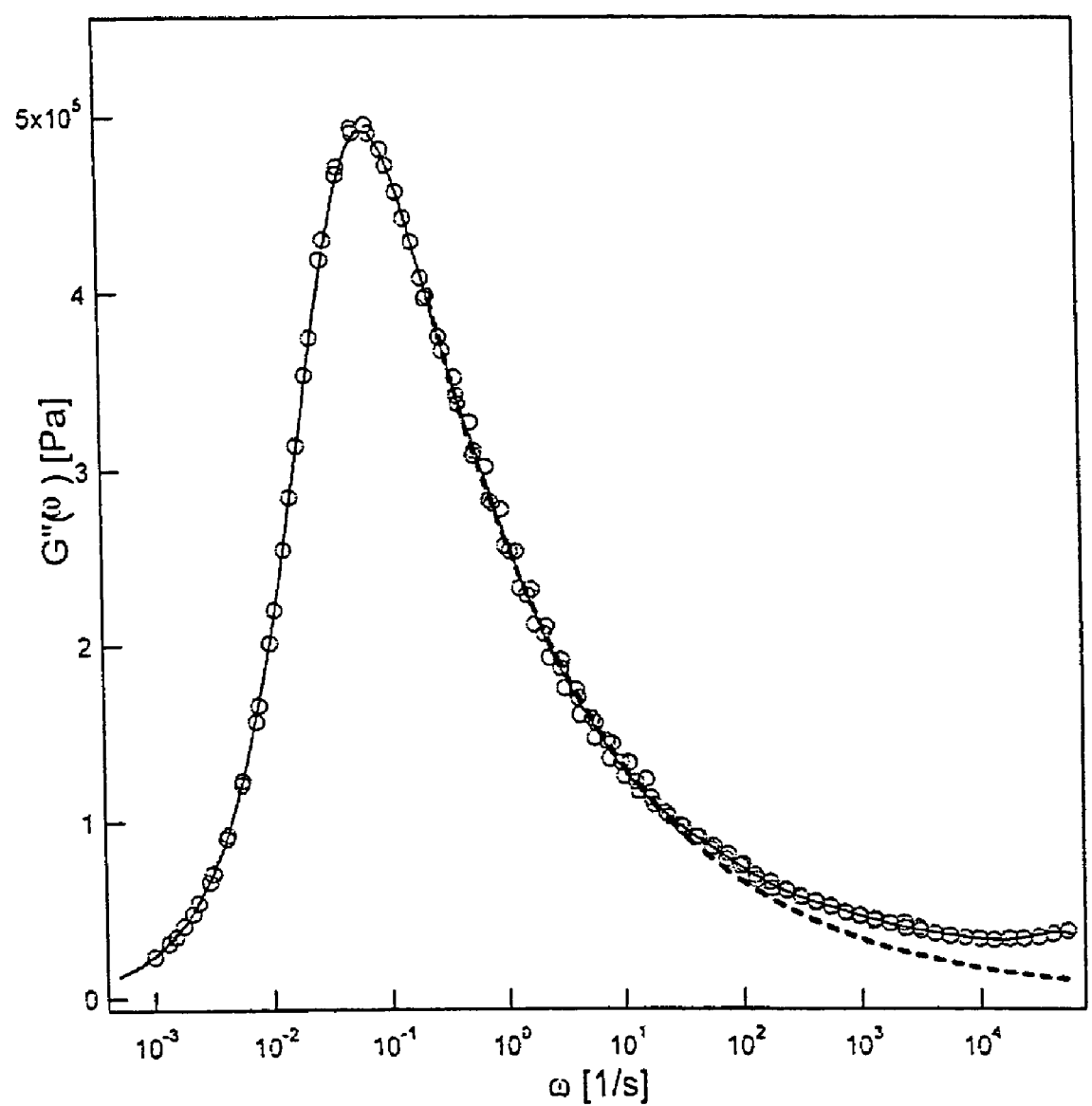
FIG. 3 is a graph of loss modulus $G''(\omega)$ versus angular frequency $\omega$ in $sec^{-1}$ for composition 2-12.

Loss modulus G" data was collected for samples 1-6a, 2-227a and 2-12 over a frequency (ω) range of $10^{-3}$ to 10 rads $sec^{-1}$, using a Rheometrics ARES rheometer in an oscillatory shear mode with 8 mm or 10 mm diameter parallel-plate geometry. RSI Orchestrator software was used to automatically derive master curves at a reference temperature ($T_o$) of 348° K. by a two dimensional minimization technique. Results for 1-6a are shown in FIG. 1. Results for 2-227a are shown in FIG. 2. Results for 2-12 are shown in FIG. 3.

The plateau modulus $G°_N$ in each case was calculated from the loss modulus data according to the formula:

$$G_N° = \left(\frac{2}{\pi}\right) \int_{-\infty}^{\infty} G''(\omega) d\ln(\omega)$$

where the units were in MPA in accordance with the procedure of Colby, R. H., Macromolecules 24, 3873 (1991).

The entanglement molecular weight $M_e$ was calculated from plateau modulus data according to the following formula:

$$M_e = \frac{\rho RT}{G_N^\circ}$$

where $\rho$ is polymer density (0.827 g/cm³ at 348 K), R the gas constant (8.314 J mol¹K¹) and T the reference temperature (348 K).

Molecular characteristics for the copolymers are shown in Table I below:

TABLE 1

| COPOLYMER | $T_g$ (K) | $M_n$ kg/mol | $M_w$ kg/mol | Mole Fraction Ethylene |
|---|---|---|---|---|
| 1-6a | 215 | 482 | 569 | 0.57 |
| 2-227a | 214 | 528 | 641 | 0.63 |
| 2-12 | 214 | 537 | 680 | 0.67 |

Plateau modules $G°_N$ data and entanglement molecular weight $M_e$ for the three copolymer samples at $T_o$=348 K determined as described above is set forth in Table 2 below.

TABLE 2

| COPOLYMER | $G°_N$ (MPa) | $M_e$ (g/mol$^{-1}$) |
|---|---|---|
| 1-6a | 2.07 | 1160 |
| 2-227a | 1.70 | 1400 |
| 2-12 | 1.85 | 1300 |

Conversion of the Table 2 $M_e$ data to 298 K and comparison to other samples at 298 K is set forth in Table 3 below.

TABLE 3

| Sample | $M_e$ g mol$^{-1}$ |
|---|---|
| PE | 600 |
| 1.6a | 920 |
| 2-12 | 1020 |
| 2-227a | 1140 |
| s-PP | 1560 |
| PEP | 1690 |
| a-PP | 4400 |

In Table 3, PE means polyethylene, s-PP means syndiotactic polypropylene having [rrrr] pentad content of 0.96, PEP means random copolymer of ethylene and propylene without propylene in syndiotactic sequences and a-PP means atactic polypropylene. The data shows that the poly(ethylene-co-syndiotactic propylene) samples have $M_e$ of about 1,000 compared to about 1,700 for PEP counterparts showing that the poly(ethylene-co-syndiotactic propylene) samples can tolerate more filler than PEP. This characteristic is retained after crosslinking to provide elastomer.

WORKING EXAMPLE I

Synthesis of Vinyl Containing Poly(ethylene-co-syndiotactic propylene)

A 6 oz. Lab-Crest® glass pressure reaction vessel (Andrews Glass) is charged with PMAO (0.30 g, [Al]/[Ti]=250) and toluene (50 mL). The reactor is placed in an ice-bath. The nitrogen atmosphere in the reactor is exchanged with propylene three times. Propylene is condensed into the reactor for 30 min at 30 psi. The ethylene is attached at 31 psi. 1,5-Hexadiene (1.0 ml) is added to the reactor via syringe. The catalyst solution (19 mg of Catalyst G described in U.S. Pat. No. 6,562,93, in 5 mL toluene) is injected by syringe. After 90 min, acidic methanol (1 mL) is added by syringe to quench the polymerization. The reactor is vented and the polymer precipitated in acidic methanol (400 mL). After stirring for several hours, the polymer is filtered, washed with methanol and dried.

The functionalized product is admixed with 0.1 to 5 weight percent sulfur and 5 to 50 weight percent carbon black filler and the admixture is formed into a torus shape and crosslinking is carried out by heating at 100 to 300° C. for 10 minutes to 5 hours, to produce filled elastomer torus shape.

WORKING EXAMPLE II

Synthesis of Anhydride Containing Poly(ethylene-co-syndiotactic propylene)

A 6 oz. Lab-Crest® glass pressure reaction vessel (Andrews Glass) is charged with PMAO (0.30 g, [Al]/[Ti]=250) and toluene (50 mL). The reactor is placed in an ice-bath. The nitrogen atmosphere in the reactor is exchanged with propylene three times. Propylene is condensed into the reactor for 30 min at 30 psi. The ethylene is attached at 31 psi. The catalyst solution (19 mg of Catalyst G described in U.S. Pat. No. 6,562,93, in 5 mL toluene) is injected by syringe. After 90 min, acidic methanol (1 mL) is added by syringe to quench the polymerization. The reactor is vented and the polymer precipitated in acidic methanol (400 mL). After stirring for several hours, the polymer is filtered, washed with methanol and dried. The polymer is then mixed with maleic anhydride and heated in the presence of the radical initiator benzoyl peroxide to generate anhydride functional poly(ethylene-co-syndio-propylene).

The functionalized product is admixed with 0.1 to 5 weight percent hexamethylenediamine and 5 to 50 weight percent carbon black filler and the admixture is formed into an ellipsoid shape and crosslinking is carried out by heating at 100 to 300° C. for 10 minutes to 5 hours to provide filled elastomer ellipsoid.

Variations

Variations will be obvious to those skilled in the art. Therefore, the scope of the invention is defined by the claims.

What is claimed is:

1. Poly(ethylene-co-syndiotactic propylene) functionalized with group(s) that enable crosslinking, the functionalized poly(ethylene-co-syndiotactic propylene) comprising from 49–70 mole percent ethylene, from 50–25 mole percent propylene, and from 1–5 mole percent crosslinking functionalizer, from 50 to 100 mole percent of the propylene being present in syndiotactic sequences, the functionalized poly(ethylene-co-syndiotactic propylene) having $M_n$ ranging from 1,000 to 2,000,000 and $M_w/M_n$ ranging from 1 to 10, the group(s) that enable crosslinking being vinyl group(s).

2. The functionalized poly(ethylene-co-syndiotactic propylene) of claim 1, which comprises from 54–65 mole percent ethylene, from 45–32 mole percent propylene, and from 1–3 mole percent crosslinking functionalizer, and has $M_n$ ranging from 400,000 to 750,000 and $M_w/M_n$ ranging from 1.10 to 1.30.

3. The functionalized poly(ethylene-co-syndiotactic propylene) of claim 2 where the crosslinking functionalizer is selected from the group consisting of $C_5$–$C_{10}$-$\alpha,\omega$-dienes.

4. The functionalized poly(ethylene-co-syndiotactic propylene) of claim 3 where the crosslinking functionalizer is 1,5-hexadiene.

5. The functionalized poly(ethylene-co-syndiotactic propylene) of claim 3 in admixture with from 0.01 to 10 weight percent crosslinking agent and from 5 to 50 weight percent filler.

6. The admixture of claim 5 which is subjected to crosslinking reaction.

7. The functionalized poly(ethylene-co-syndiotactic propylene) of claim 4 in admixture with from 0.01 to 10 weight percent crosslinking agent and from 5 to 50 weight percent filler.

8. The admixture of claim 7 which is subjected to crosslinking reaction.

9. The functionalized poly(ethylene-co-syndiotactic propylene) of claim 3 where ethylene, propylene and the 1,5-hexadiene monomers are used to produce the functionalized poly(ethylene-co-syndiotactic propylene).

10. The admixture of claim 5 where the crosslinking agent is sulfur.

11. The admixture of claim 10 which is subjected to crosslinking reaction.

12. The admixture of claim 7 where the crosslinking agent is sulfur.

13. The admixture of claim 12 which is subjected to crosslinking reaction.

* * * * *